(12) United States Patent
Lu et al.

(10) Patent No.: US 8,086,496 B2
(45) Date of Patent: Dec. 27, 2011

(54) AGGREGATION OF PRODUCT DATA PROVIDED FROM EXTERNAL SOURCES FOR PRESENTATION ON AN E-COMMERCE WEBSITE

(75) Inventors: Yong Lu, Sammamish, WA (US); Trevin Chow, Redmond, WA (US); Herman John Man, Issaquah, WA (US); Derek Lynn Jamison, Bellevue, WA (US); Mark Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 12/025,791

(22) Filed: Feb. 5, 2008

(65) Prior Publication Data

US 2009/0198594 A1    Aug. 6, 2009

(51) Int. Cl.
  *G06Q 30/00* (2006.01)
(52) U.S. Cl. ........................................ 705/26.1
(58) Field of Classification Search ............... 705/26.1
  See application file for complete search history.

(56) References Cited

U.S. PATENT DOCUMENTS

| 7,003,504 | B1* | 2/2006 | Angus et al. ................ 1/1 |
| 7,082,426 | B2 | 7/2006 | Musgrove et al. |
| 7,110,967 | B1 | 9/2006 | Espenes et al. |
| 7,197,475 | B1 | 3/2007 | Lorenzen et al. |
| 7,617,184 | B2* | 11/2009 | Ferrari et al. ................ 1/1 |
| 2003/0126026 | A1 | 7/2003 | Gronberg et al. |
| 2003/0187743 | A1 | 10/2003 | Kumaran et al. |
| 2005/0027611 | A1 | 2/2005 | Wharton |
| 2005/0066059 | A1 | 3/2005 | Zybura et al. |
| 2005/0234734 | A1 | 10/2005 | Chan et al. |
| 2007/0011155 | A1* | 1/2007 | Sarkar ........................ 707/5 |
| 2009/0049403 | A1* | 2/2009 | Jones ....................... 715/810 |

OTHER PUBLICATIONS

SAP NetWeaver(TM) Master Data Management Enhanced with A2i Acquisition; PR Newswire. New York: Jul. 13, 2004. p. 1; http://proquest.umi.com/pqdweb?did=662386761&sid=2&Fmt=3&clientId=19649&RQT=309&VName=PQD.*
Bergamaschi, et al., "A Data Integration Framework for E-commerce Product Classification." pp. 1-15.
Benetti, et al., "An Information Integration Framework for E-Commerce." Date: Jan.-Feb. 2002, pp. 18-25.
Adya, et al., "Anatomy of the ADO.NET Entity Framework." pp. 877-888.

* cited by examiner

*Primary Examiner* — Mila Airapetian (57) ABSTRACT

Aggregation of product data provided from external sources of product data for presentation on an e-commerce website. A set of product data related to a product that is offered for sale in e-commerce is accessed and subjected to an aggregation process. The set of product data is mapped for aggregation with other sets of product data based on an existing mapping or on an absence of an existing mapping. Access is provided to an aggregated set of product data that includes the set of product data that is mapped for aggregation with other sets of product data, for presentation on an e-commerce website.

20 Claims, 9 Drawing Sheets

AGGREGATION OF PRODUCT DATA PROVIDED FROM EXTERNAL SOURCES FOR PRESENTATION ON AN E-COMMERCE WEBSITE

BACKGROUND

E-commerce websites are websites that facilitate the buying and selling of products or services (e.g., software, etc.) over electronic systems such as the internet or other computer networks. Many companies maintain e-commerce websites that that allow consumers to review information about, and/or purchase various products that they are offering for sale. Information that is posted on these websites can come from sources of product data that are external to the product team of the companies that maintain these sites.

When information about a product is provided to an e-commerce website from disparate external sources, the information about the product that is provided is susceptible to duplication. Moreover, a matching up of the information provided about a product from one external source with information provided about the product from another external source can be difficult. This is because the information provided about a product may not be entirely complete and because subsequent provisions of information about the product may come in the form of meta-data that is only a subset of other provisions of information about that product.

This is particularly true for e-commerce websites of companies whose product catalog can be populated with data from providers that are external to their product team. It should be appreciated that the duplicated products information can cause confusion as it relates to ascertaining for which product information actually represents a product. Conventional e-commerce sites do not possess systems that address the causes of such confusion. Moreover, conventional e-commerce sites do not possess systems to collect information from the disparate sources about a product in a manner that ensures that all of the collected information is fully reflected in the information that is eventually presented about the product.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional e-commerce websites do not adequately match product data for their web based catalogs that is related to the same product that comes from disparate external sources. A methodology for aggregating product data provided from external sources of product data for presentation on an e-commerce website that minimizes duplicated product data and improves the quality of the metadata (e.g., details related to attributes of a product) that is presented for each product is disclosed. As a part of an aggregation, a set of product data related to a product that is offered for sale in e-commerce is accessed and subjected to an aggregation process. The set of product data is mapped for aggregation with other sets of product data based on an existing mapping or on an absence of an existing mapping. Access is provided to the aggregated set of product data (such as through delivery or storage for later retrieval) for presentation to customers on the e-commerce website.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Nomenclature

In the descriptions that follow the term "set of product data" is intended to refer to information, such as may be presented on an electronic display of a computer that is provided from an external source that describes a conceptually integral commodity such as a software suite in a detailed and systematic manner. The term "master set of product data" is intended to refer to a set of product data under which other sets of product data are aggregated. The term "attribute" is intended to refer to traits or properties of a commodity, e.g., color, size, price, etc. The term "aggregation" is intended to refer to the mapping of a set of product data to a master set of product data. The term "offer" is intended to refer to price and delivery information associated with a set of product data or a master set of product data. The term "obsolescence" is intended to refer to the process of deleting the contribution of a set of product data from an aggregation in response to a deletion of the set of product data from the external data source. The term "mapping" is intended to refer to the association of a set of product data to its master set of product data. The term "remapping" is intended to refer to a change in the mapping of a set of product data. And, the acronym "SPD" is intended to refer to "set of product data."

Figure 1A:
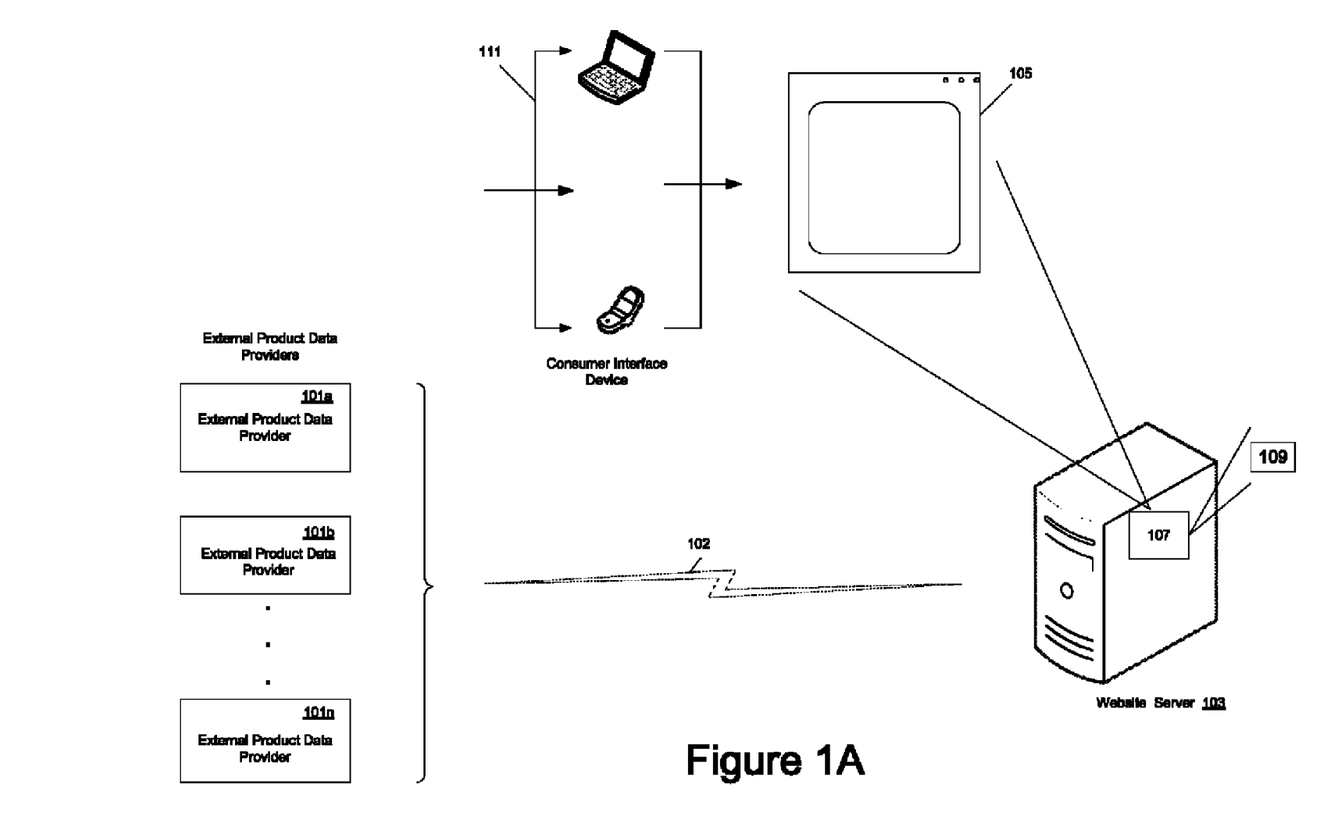
FIG. 1A shows an exemplary setting of a system for aggregation of product data for presentation on an e-commerce website according to one embodiment.

Exemplary Network Setting of System for Aggregation of Product Data Provided from External Sources for Presentation on an E-Commerce Website According to Embodiments FIG. 1A shows an exemplary setting of a system 107 for aggregation of product data for presentation on an e-commerce website according to one embodiment. System 107 aggregates sets of product data that are provided from external sources of product data in a manner that minimizes the duplication of sets of product data in a web based product catalog associated with an e-commerce website. Additionally, system 107 enables a contribution of product metadata for each product from various external sources of product data such that the attribute values of each product in the product catalog is enriched. FIG. 1 shows external product data providers 101a-101n, communication channel 102, website server 103, website graphical user interface (GUI) 105, e-commerce website 107, system 109 and consumer interface device 111.

Referring to FIG. 1A, external product data providers 101a-101n provide product data (e.g., information about a product that an e-commerce website is offering for sale) to an e-commerce website 107 via an communication channel 102 (e.g., network link) related to a product that is being offered for sale on the e-commerce website 107.

E-commerce website server 103 is a computer upon which runs the computer program from which e-commerce website 107 is derived. In one embodiment, e-commerce website 107 allows consumers to view information related to various products that are being offered for sale on website 107. In one embodiment, website 107 can be accessed via website GUI 105 that is associated with website 107. In one embodiment, website GUI 105 can be accessed via a consumer interface device 111 using a web browser.

System 109 aggregates product data that is provided by various external sources of product data (e.g., external to a companies product team) that is related to particular products that are being offered for sale on e-commerce website 107. Additionally, in one embodiment, system 109 provides access to the aggregated product data for presentation on e-commerce website 107. In one embodiment, system 109 can be a part of e-commerce website 107. In another embodiment, system 109 can be separate from e-commerce website 107 but can operate cooperatively with e-commerce website 107.

In one embodiment, system 109 uses mapping rules to determine how product data received from the aforementioned various external sources are to be aggregated. In one embodiment, product data is mapped to a master set of product data that is presented on e-commerce website 107 (e.g., as a part of a web based product catalog). Moreover, in one embodiment, in the absence of a related master set of product data, a new master set of product data that includes the received product data can be registered and presented on e-commerce website 107. In one embodiment, system 109 can encompass an aggregation algorithm that employs the flexible utilization (e.g., plug-in) of mapping rules (see section on mapping rules). In one embodiment, each mapping rule dictates how data elements from different external data sources should be mapped to its designated aggregation.

Figure 1B:
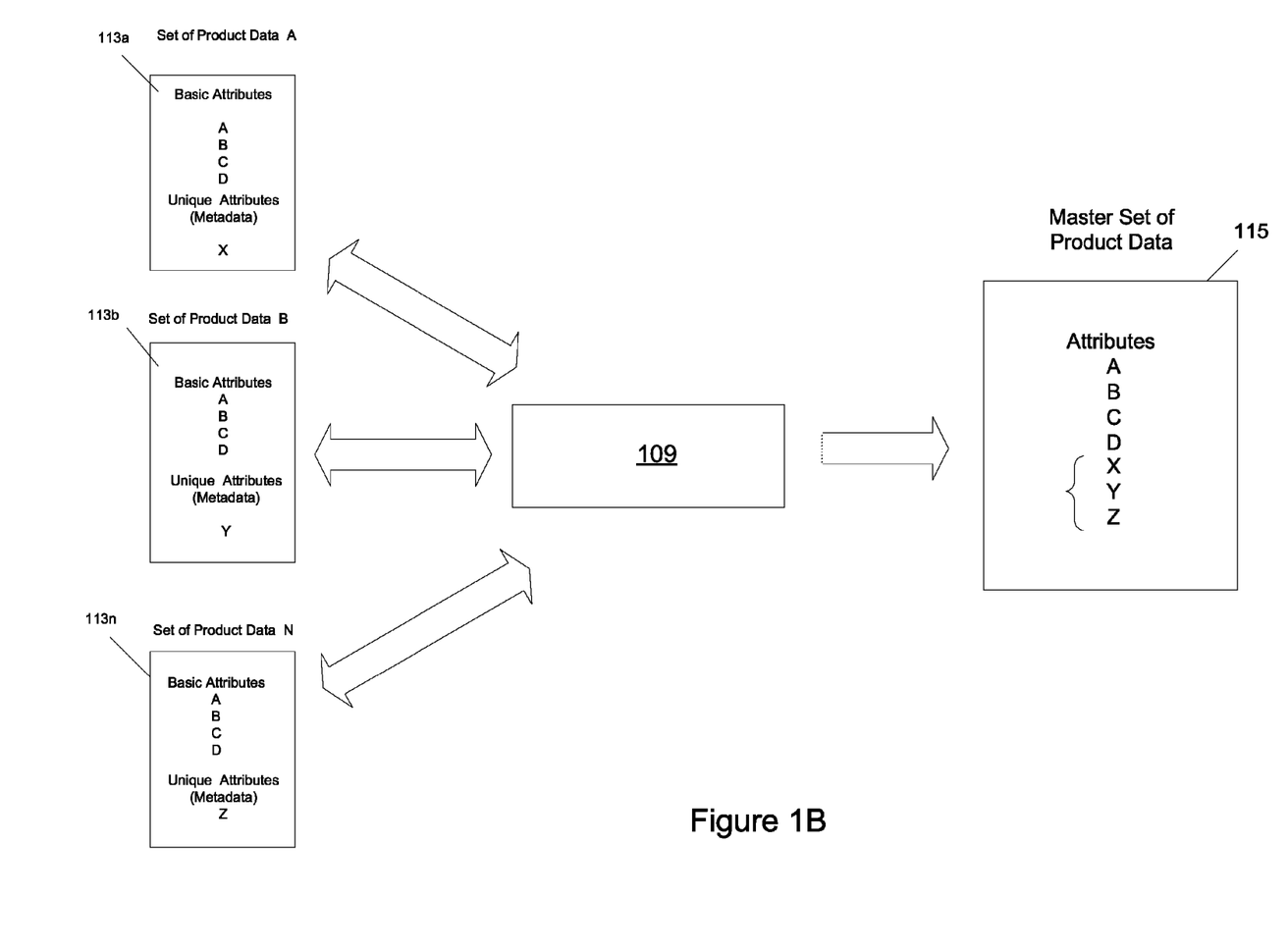
FIG. 1B illustrates how various sets of product data received from respective external data providers by system are aggregated according to one embodiment of the present invention.

FIG. 1B illustrates how various sets of product data received from respective external product data providers (e.g., 101a-101n in FIG. 1A) by system 109 are aggregated according to one embodiment of the present invention. Referring to FIG. 1B, system 109 accesses the respective sets of product data (set of product data A 113a, set of product data B 113b and set of product data N 113n) that are provided by respective external product data providers and aggregates the information that is contained by them to produce a master set of product data 115 (e.g., an aggregated set of product data) that is catalogued and presented on e-commerce website (e.g., 107 in FIG. 1A) for customers to view. In the FIG. 1B example, each of the sets of product data, 113a-113n, that are received from the respective external data providers include attributes, for example, A-D, that cause them to be mapped to master set of product data 115 based on mapping rules. However, sets of product data 113a-113n can include other attributes that they can uniquely contribute as meta-data as a part of their aggregation under master set of product data 115 (see X, Y and Z contributed by 113a, 113b and 113n respectively to the attributes of master set of product data 115).

It should be appreciated that the rules that determine which instance of the attributes A-D (e.g., which presentation of A-D from respective sets of product data 113a-113n) is to appear in the aggregated set of product data that is presented to customers are discussed in detail below. These rules determine how sets of product data are to be aggregated and provide for the updating and deleting of information from product data that is presented to customers. In this manner, the duplication of product data in the product catalogue is minimized while the quality of descriptive meta-data that is gleaned from contributing sets of product data is improved.

Operation

Figure 1C:
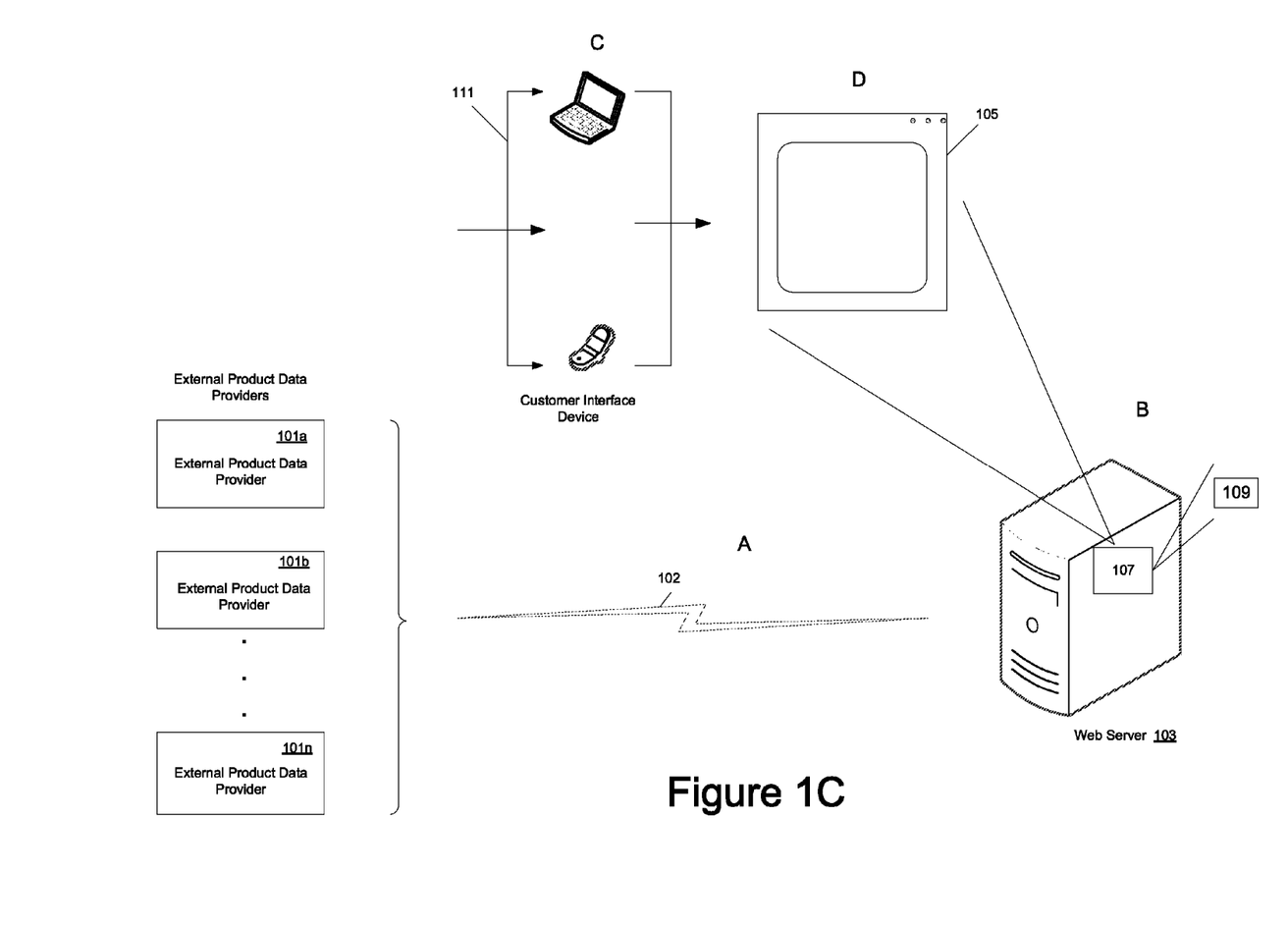
FIG. 1C illustrates operations A-D performed in a process for aggregating and presenting product information to customers in an exemplary operational setting according to one embodiment.

FIG. 1C illustrates operations A-D performed in a process for aggregating and presenting product information to customers (in an exemplary operational setting) according to one embodiment. These operations including the order in which they are presented are only exemplary. In other embodiments, other operations in other orders can be included.

At A, a set of product data is provided by disparate external sources of product data via communication channel 102. At B, the set of product data is accessed by system 109 and is subjected to aggregation processes such as are described herein wherein the accessed set of product data is aggregated under the master set of product data and posted on e-commerce website 107. At, C a website visitor accesses e-commerce website 107 via customer interface device 111. And, at D the aggregated master set of product data is presented to the website visitor via website GUI 105.

Exemplary Mapping Data According to One Embodiment

In one embodiment, system 109 utilizes various types of mapping related tables and data in the aggregation operations that are described herein. In one embodiment, mapping related tables and data used in aggregation operations can include but are not limited to current mappings table, mapping rules table, mapping rules precedence table and master item redirection table. These tables are described in detail in the following sections.

Current Mappings Table

In one embodiment, current mappings table includes data such as ProviderID, ProductID, MasterProductID, MappingRuleID that enable the mapping of product data. In one embodiment, each set of product data that is referenced in incoming data from a provider possesses a ProductID that is unique to that provider, but is not necessarily unique across all providers. Moreover, in one embodiment, each external data provider is assigned a unique ProviderID. And, E-commerce website (e.g., 107 in FIG. 1A) uniquely references all product data contained in the catalog by the MasterProductID.

In one embodiment, a ProductID and a MasterProductID together identify the set of product data that is aggregated to a master set of product data. Moreover, a ProviderID is also employed since, in one embodiment, aggregation of this kind is addressed as a generic problem, and, chances are that a ProductID may be the same for different items that are provided from different external data source. In one embodiment, a MappingRuleID identifies which mapping rule caused the item to be aggregated to the master item.

In one embodiment, the Current Mappings Table can have one mapping per row. The logical schema of the Current Mappings Table is shown below:

TABLE 1

| Parameters | Definition |
|---|---|
| ProviderID | The unique identifier of the external data provider |
| ProductID | The unique identifier of a set of product data provided by the external data provider |
| MasterProductID | The unique identifier of a master set of product data that the set of product data is mapped to |
| Processed | Boolean flag indicating whether this mapping is processed after each aggregation processing. The detailed semantics of this flag is discussed in this section below |
| IsMainSPD | Boolean flag indicating whether this set of product data is the main contributing item in the aggregation among all other items that are mapped to the same master set of product data |

Detailed Semantics

In one embodiment, the Current Mappings Table is designed to replicate the Authoritative Mappings Table at the beginning and ending of each aggregation run. The purpose of the Current Mappings Table is to help identify differences between the current set of product data and the set of product data generated from the previous aggregation, such that the aggregation system (e.g., 109 in FIG. 1A) can correctly reconcile the aggregation data in the two tables and trigger customizable actions.

In one embodiment, when each aggregation run is started, the set of {ProviderID, ProductID, MasterProductID} tuples that are contained by the Current Mappings Table is an exact subset of those contained in the Authoritative Mappings Table. In one embodiment, tuples that are contained by the Authoritative Mappings Table but not the Current Mappings Table are those that are based on manually created mappings. Moreover, this information is not contained at that point in time in the external data source. In one embodiment, the design of the aggregation system (e.g., 109 in FIG. 1A) allows sets of product data that are contained in external data sources (e.g., 101 in FIG. 1A) to be temporarily removed and subsequently added back while maintaining the manually created mapping information.

In one embodiment, during the processing of each aggregation run, the set of {ProviderID, ProductID, MasterProductID} tuples that is contained in the Current Mappings Table may deviate from the set of tuples that is contained in the Authoritative Mappings Table according to the set of product data that is contained in the external data source. There are three possible causes of such deviation: (1) a set of product data has its attribute data changed (when this occurs the set of product data will be mapped according to the mapping rule of highest precedence among those applicable, to a different master set of product data); (2) a set of product data is deleted from the external data source; and (3) new product data is added from external data source, but its ProductID is not in the Authoritative Mappings Table.

In one embodiment, whenever such deviation happens, the aggregation algorithm will reconcile the difference between the mapping of the {ProviderID, ProductID, MasterProductID} tuple in the Authoritative Mappings table and the Current Mappings Table. A detailed discussion of reconciliation is made herein with reference to the algorithm of FIG. 4. In one embodiment, after each aggregation run, the set of {ProviderID, ProductID, MasterProductID} tuples that is contained in The Current Mappings Table is again an exact subset of that which is contained in the Authoritative Mappings Table.

In one embodiment, referring to Table 1, the processed flag parameter is designed to register the deletion of an item from external data source. At the beginning of each aggregation run, this Boolean flag is set to be false. During the aggregation, if the {ProviderID, ProductID, MasterProductID} tuple is encountered when iterating through the external data, then the flag is set to true. Thereafter, when the aggregation run is finished, all mappings that have the processed flag as false will be eliminated from this table. Whenever a set of product data is deleted from external data source, after such an aggregation run, the processed flag of that set of product data's mapping will be left as false. Moreover, all sets of product data that have mappings with processed flag indicated as false will have its mapping in the Current Mappings Table eliminated. Additionally, the set of product data's contribution to the master item aggregation will also be eliminated.

In one embodiment, customized logic can be used to determine whether the {ProviderID, ProductID, MasterProductID} tuples that are eliminated from the Current Mappings Table should be removed from the Authoritative Mappings Table as well. Referring again to Table 1, in one embodiment, the IsMainSPD flag can be designed to allow extra customizability to determine how a set of product data will contribute its data to the aggregation (is the set of product data the main set of product data contributing to master set of product data) in the master set of product data (see merging of attributes for detail).

Mapping Rules

In one embodiment the mapping rules determine how a set of product data is to be mapped (to which master set of product data it is mapped, the level of precedence of the mapping assignment, etc.). In one embodiment, the Mapping Rules Table contains generic mapping rules. In one embodiment, two tables may be used: the Mapping Rules Table itself and the Mapping Rules Attribute Table that describes the attributes used for the mapping.

An exemplary logical schema of a Mapping Rules Table according to one embodiment is shown below:

TABLE 2

| Parameter | Definition |
|---|---|
| MappingRuleID | Unique identifier of a mapping rule (See details below) |
| MappingRuleType | Type of the mapping rule |
| KeepAuthoritativeMapping | Boolean flag indicating whether to keep the authoritative mapping when the mapping is eliminated in the current mappings table in case the set of product data is deleted from |

TABLE 2-continued

| Parameter | Definition |
| --- | --- |
|  | the external data source |
| MappingLogic | If the mapping type is external executable code, this is the column where the information of the executable module will be found. (See details below) |
| Description | Brief description of the mapping rule |
| AuditingInformation | Creation/Modification, time and user. In XML format |

An exemplary logical schema for a Mapping Rules Attributes Table according to one embodiment is shown below:

TABLE 3

| Parameter | Definition |
| --- | --- |
| MappingRuleID | ID of the mapping rule |
| SourceAttribute | Attribute of the set of product data used for the mapping |
| DestinationAttribute | Attribute of the master set of product data used for the mapping |

Mapping Types

In one embodiment, mapping types include absolute, unknown, equality, and generic. In one embodiment, absolute mapping indicates that the mapping was created by the manual configuration of an administrator of the aggregation system (e.g., 109 in FIG. 1A). In one embodiment, there is only one built-in mapping rule of this type. It should be appreciated that absolute mapping does not have associated source/destination attribute pairs. In one embodiment, unknown mapping indicates that the mapping is created when there is no other rule applicable for the current set of product data. In one embodiment, when there is no other rule applicable for the current set of product data a new master set of product data is created for the aggregation. In one embodiment, there is only one built-in mapping rule of this type. Moreover, rules of this type do not have associated source/destination attribute pairs.

In one embodiment, equality mapping indicates that the mapping will be created if and only if the source attributes of the current set of product data are exactly the same as the destination attributes of the master set of product data to which it is being mapped. In one embodiment, generic mapping indicates that external code will be called to determine if the current set of product data should be mapped to the master set of product data.

In one embodiment, the generic mapping rule can have an associated .Net class that can implement an interface (defined in C# language) such as is shown in the following example:

```
interface IAggregationMappingRule
{
    bool MapsTo (string ItemID, string MasterItemID,
List<String>SourceAttributeNames,
List<String>DestinationAttributeNames);
}
```

In one embodiment, the MappingLogic column of the Mapping Rules Table discussed above, stores the fully qualified name of the class that implements the IAggregationMappingRule interface. At runtime, an instance of this class may be created and used as a user-defined common language runtime (CLR) function to determine if a set of product data should be mapped to a master set of product data. However, it should be appreciated that the above shown interface is just an example. In exemplary embodiments, the overall design enables flexible implementation choices.

Mapping Rules Precedence Table

In one embodiment, the Mapping Rules Precedence Table is used to store the precedence of each rule in case that there are multiple mapping rules that are applicable for mapping a set of product data. An exemplary Mapping Rules Precedence Table Logical Schema according to one embodiment is shown in the following table:

TABLE 4

| Parameters | Definitions |
| --- | --- |
| MappingRuleID | Unique identifier of the mapping rule |
| Precedence | Positive integer number of the mapping rule |

In one embodiment, the lower the precedence number, the higher the precedence. In another embodiment, other manners of determining highest precedence can be employed. Also, in one embodiment, absolute mapping has the highest precedence and unknown mapping has the lowest precedence.

Merging of Data

In one embodiment, the merging of data is the step where the actual data aggregation occurs. There are two parts of this step: (1) the merging of attributes of items into the master item, and (2) the merging of additional data portions that are to be associated with the master item.

In one embodiment, as it regards merging of attributes of sets of product data into the master set of product data, in this sub-step, all attributes from each aggregated set of product data will be copied to the master set of product data. However, in reality, there may be conflict of the merged attribute data if the destination attribute is designated to be single-valued and there are multiple aggregated sets of product data with the same attribute.

In one embodiment, reconciliation logic can be employed to determine which set of product data will contribute the attribute data. In one embodiment, the reconciliation logic can be straightforward and is based on the IsMainSPD column of the Current Mappings Table: the value for this column is initially set to be false, however, if the set of product data (SPD) in the Current Mappings Table has IsMainSPD=true, then all the attributes in the master set of product data will be contributed by this set of product data, except for ImageURL and associated offers (these are merged).

In one embodiment, the "IsMainSPD" column is determined by the SPDContributionPrecedence Table. An exemplary logical schema of this table according to one embodiment is shown below:

TABLE 5

| Parameters | Definitions |
| --- | --- |
| ProviderID | Unique identifier of the external data source |
| Precedence | Unique integer value indicating the precedence of data from each external data source |

SPDContributionPrecedence Table facilitates straightforward data merging reconciliation logic like the following: (1) sets of product data from the external source with highest precedence will be the candidates as MainSPD, (2) for sets of product data from the same external source, the set of product data with the top ProductID (such as in ascending alphanumeric or lexicographical order) will be the single MainSPD and its mapping in the current mappings table will be set to IsMainSPD=true. In one embodiment, although the above implementation uses straightforward logic for performance considerations and can be based on specific domain knowledge, generic customizable logic can be used to determine at runtime how each set of product data will contribute to the aggregation in the master set of product data. In one embodiment, additional data such as offer data can be associated with the master set of product data.

Obsolescence

In one embodiment, obsolescence occurs when one set of product data has its attribute(s) data changed in an external data source, if the updated attributes are either: (1) used in the mapping rule that is currently used for the mapping or (2) merged into the master set of product data's attribute data. In one embodiment, for case (1), the set of product data should be re-mapped to a new master set of product data. In one embodiment, there are two exemplary cases where the set of product data should be re-mapped to a new master set of product data: (A) if the set of product data is the only set of product data that is aggregated to the master set of product data (then the master set of product data will be deleted) and (B) if the set of product data is contributing attribute data or an additional data chunk to the master set of product data (then its contribution will be deleted from the master set of product data).

However, because it is likely that the contribution of the set of product data that is deleted may have been effected because it had higher precedence than other aggregated items, the other aggregated sets of product data should be reevaluated to determine if any of them will contribute to fill the vacancy. This process is termed attribute reflow.

In one embodiment, for case (B), it should be determined if the attributes in the aforementioned set of product data have contributed any attribute data to the master set of product data. If the attributes have contributed attribute data, then it should be determined whether the attribute data that the set of product data is contributing has been changed or deleted. There are three exemplary cases: (i) if the attribute data has been changed, then the corresponding attribute data in the master set of product data should be updated accordingly, (ii) if the attribute data has been deleted, then the corresponding attribute data in the master set of product data should be deleted as well, and (iii) if new attribute data has been added, then the attribute data can be added through operation of customizable logic.

However, there are two exemplary sub-cases as it relates to (ii): (a) if the attribute is single valued, then the attribute reflow described above should be applied and (b) if the attribute is multiple valued, and the contribution from the current set of product data is the only contribution, then the attribute reflow described above should be applied in such case as well. As it regards (iii), in one embodiment, if the set of product data is the MainSPD, then the attribute data will actually be added to the master set of product data. Moreover, if the set of product data is not the MainSPD, but the attribute data is designated to be merged into multi-valued attributes in the master set of product data, then the attribute data will be added into the master set of product data as well.

Triggering External Action

In one embodiment, when deviation between the current mappings table and the authoritative mappings table is detected, certain external actions can be triggered. In one embodiment, three kinds of events can trigger an external action: (1) an addition of an item, (2) a remapping of an item or (3) a deletion of an item. In one embodiment, when a set of product data is remapped from one master set of product data to another, the remapping is logged into a MasterSPDRedirection Table. An exemplary logical schema for this table according to one embodiment is shown below:

TABLE 6

| Parameters | Definitions |
| --- | --- |
| OldMasterSPD ID | The ID of the master set of product data that is previous mapped to |
| NewMasterSPD ID | The ID of the master set of product data that is currently mapped to |

This table is useful where one set of product data is remapped and it is the only aggregated set of product data of the old master set of product data. In such cases the old master set of product data will be deleted. However, since the old master set of product data ID may have been used as part of external published data such as a URL, this remapping will create an invalid URL. In one embodiment, the redirection table will be used to redirect the URL pointing to the old master set of data to that of the new master set of product data.

Authoritative Mappings Table

The authoritative mappings table has one mapping per row. An exemplary logical schema for this table is shown below:

TABLE 7

| Parameter | Definition |
| --- | --- |
| ProviderID | The unique identifier of the external data provider |
| ProductID | Unique identifier of a set of product data provided by the external data provider |
| MasterProductID | Unique identifier of a master set of product data that the set of product data is mapped to |
| MappingRuleID | Unique identifier of the mapping rule that created the mapping |

Figure 2A:
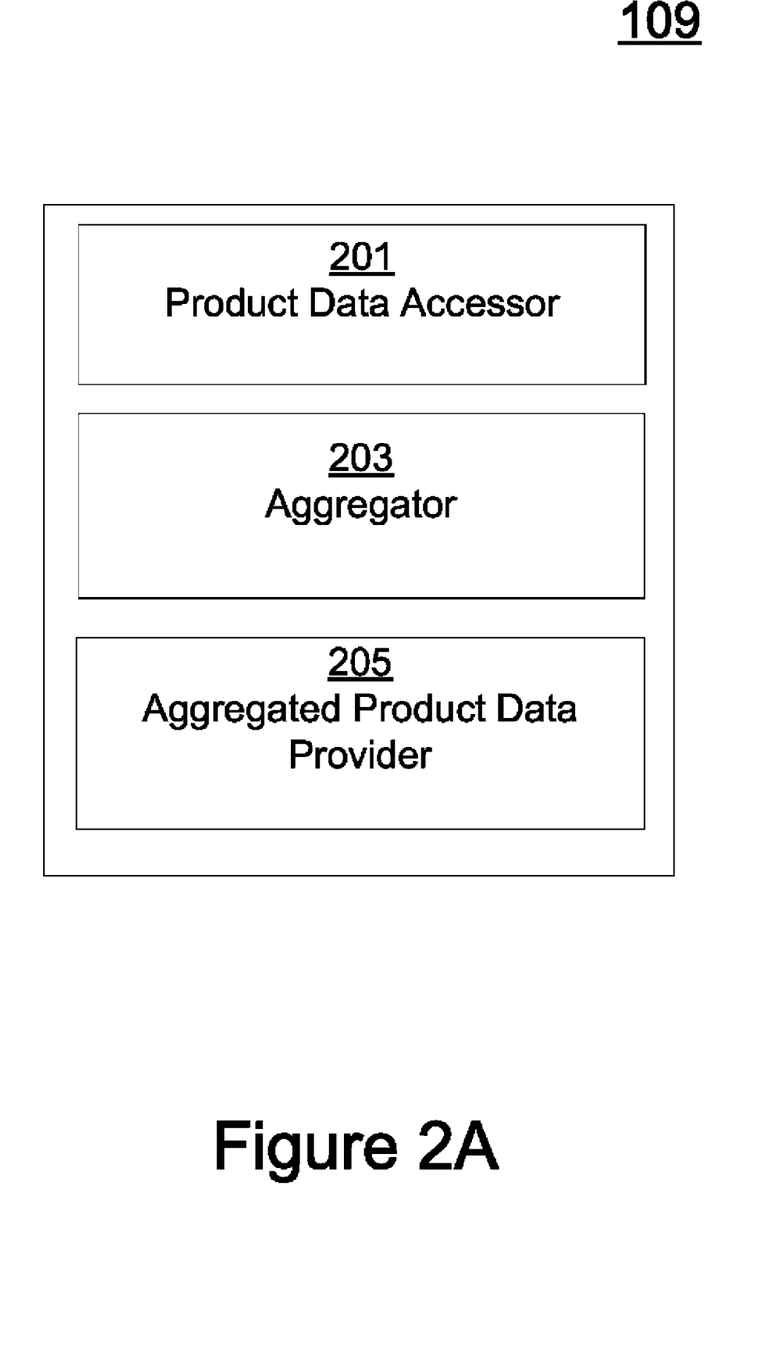
FIG. 2A shows a block diagram of components of a system for aggregation of product data according to one embodiment.

Components of System for Aggregation of Product Data Provided from External Sources for Presentation on an E-Commerce Website According to Embodiments FIG. 2A shows a block diagram of components of a system 109 for aggregation of product data according to one embodiment. In one embodiment, system 109 implements an algorithm for aggregation of product data (see FIG. 4). In the FIG. 2A embodiment, system 109 includes product data accessor 201, aggregator 203 and aggregated product data provider 205.

It should be appreciated that aforementioned components of system 109 can be implemented in hardware or software or in a combination of both. In one embodiment, components and operations of system 109 can be encompassed by components and operations of one or more computer programs (e.g., computer program from which e-commerce website 107 in FIG. 1A is derived etc.). In another embodiment, components and operations of system 109 can be separate from the aforementioned one or more computer programs but can operate cooperatively with components and operations thereof.

Product data accessor 201 accesses sets of product data related to a product that is offered for sale in e-commerce. In one embodiment, the sets of product data can be provided by external data providers, that supply data related to products offered for sale on an associated e-commerce website (e.g., 109 in FIG. 1A). In one embodiment, the sets of product data can have associated offers (see discussion made with reference to FIG. 2B).

Aggregator 203 subjects the sets of product data that are accessed by product data accessor 201 to an aggregation process. In one embodiment, as a part of the aggregation process, respective sets of product data that are accessed by product data accessor 201 are mapped for aggregation under a master set of product data to which the respective sets of product data are related. Operations performed as a part of an exemplary aggregation are discussed in detail with reference to FIG. 4.

Figure 2B:
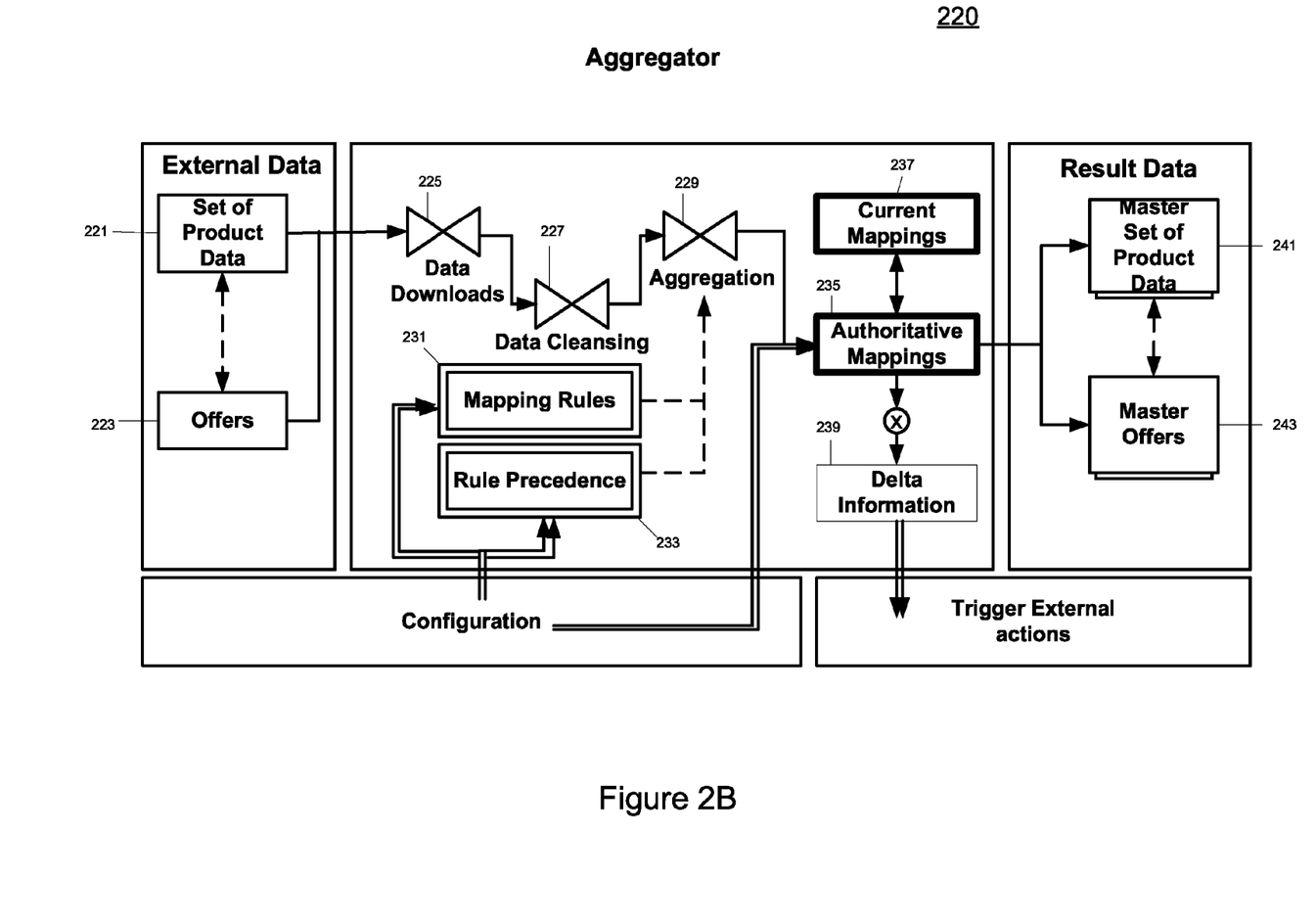
FIG. 2B shows a functional block diagram of an implementation of a system for aggregating product data according to one embodiment.

Aggregated product data provider 205 provides access to the master set of product data for presentation on an associated e-commerce website. In one embodiment, the master set of product data can be included as an entry in the product catalogue of the e-commerce website. FIG. 2B which is discussed below illustrates the function of an implementation of system 109.

FIG. 2B shows a functional block diagram 220 of an implementation of system 109 according to one embodiment. FIG. 2B shows set of product data 221, offers 223, data downloads 225, data cleansing 227, aggregation 229, mapping rules 231, rule precedence 233, authoritative mappings 235, current mappings 237, delta information 239, master set of product data 241 and master offers 243.

Referring to FIG. 2B, in initial operations, external data such as set of product data 221 and associated offers 223 are downloaded 225 from an external source of product data. Thereafter, set of product data 221 is provided for data cleansing 227 wherein set of product data 221 is preprocessed for aggregation. Next, set of product data 221 is mapped to master set of product data 241 according to mapping rules 231. In one embodiment, the rules that are used for mapping set of product data 221 to master set of product data 241 are chosen based on rule precedence 233.

In one embodiment, authoritative mappings table 235 stores information related to the actual mappings. In one embodiment, it should be appreciated that manual mapping may be allowed to effect the mapping of set of product data 221 to set of master product data 241. Moreover, it should be appreciated that current mappings table 237 stores a copy of the mappings that are stored in authoritative mappings table 235. However, during an aggregation session, if set of product data 221 is externally updated, or if new data is added to set of product data 221 in an external data source, current mappings table 237 will reflect the new mapping information.

Thereafter, the mapping information that is contained in current mappings table 237 can be reconciled with the mapping information that is contained in authoritative mappings table 235. In one embodiment, delta information 239 can be calculated based on the differences that are detected between the information contained in authoritative mappings table 235 and current mappings table 237. Delta information 239 can be used to perform operations during and/or after the aggregation.

Figure 3:
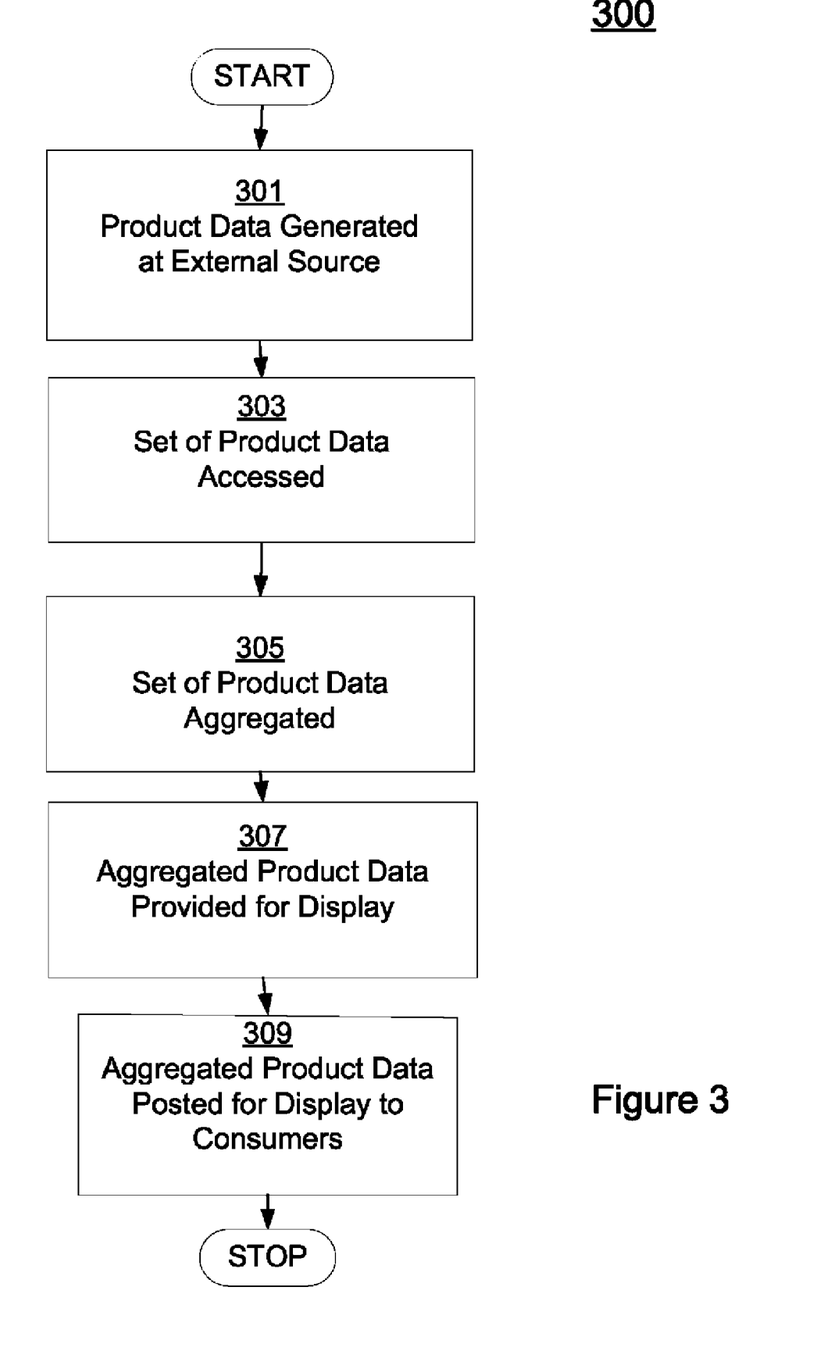
FIG. 3 shows a flowchart of the steps performed in a method for aggregating product data according to one embodiment.

Exemplary Operations of Method for Aggregation of Product Data Provided from External Sources for Presentation on an E-Commerce Website According to Embodiments FIG. 3 shows a flowchart 300 of the steps performed in a method for aggregation of product data according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at step 301 a set of product data is generated at an external source of product data. In one embodiment, the set of product data can include associated offers (see FIG. 2B).

At step 303, a set of product data that is related to a product that is offered for sale in e-commerce is accessed. In one embodiment, a product data accessor (e.g., 201 in FIG. 2A) can access sets of product data related to a product that is offered for sale in e-commerce.

At step 305, the set of product data accessed at 303 is subjected to an aggregation process. In one embodiment, an aggregator (e.g., 203 in FIG. 2A) can be used to aggregate the sets of product data that are accessed.

At step 307, access is provided to the aggregated product data (e.g., master set of product data). In one embodiment, an aggregated product data provider (e.g., 205 in FIG. 2A) can be used to provide access to the master set of product data for presentation on an associated e-commerce website.

At step 309, the aggregated product data (e.g., master set of product data) is posted for display on an e-commerce website to consumers. In one embodiment, as discussed herein, the master set of product data can be included as an entry in an online product catalogue of the e-commerce website.

Figure 4:
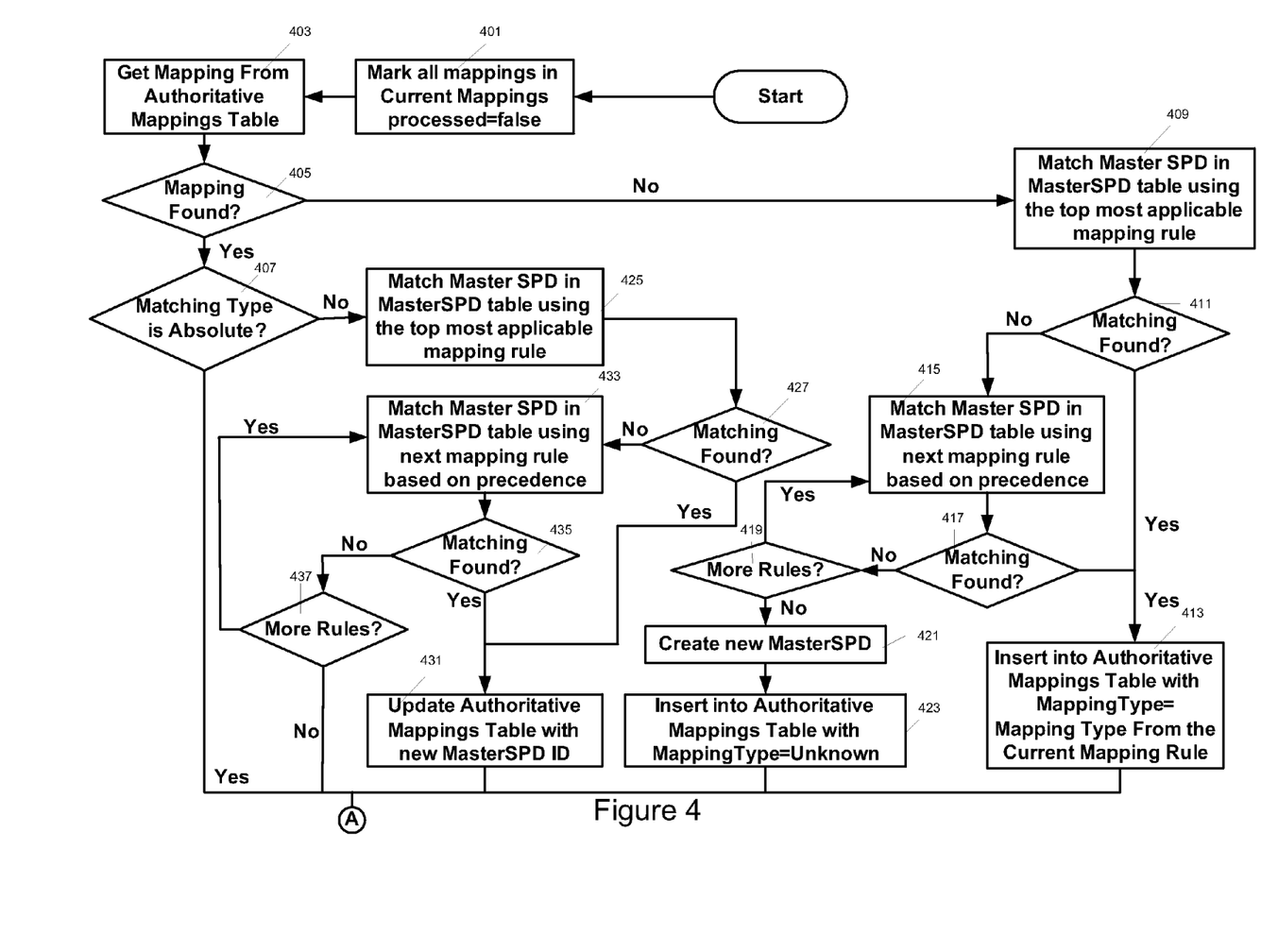
FIG. 4 shows a flowchart of the steps in an exemplary algorithm of the aggregation processes described herein according to one embodiment.

FIG. 4 shows a flowchart of the steps in an exemplary algorithm 300 of the aggregation processes described herein according to one embodiment. In one embodiment, algorithm 300 is an exemplary implementation of step 305 of FIG. 3.

Referring to FIG. 4, at 401 all mappings in the current mappings table are marked processed=false. At 403 a mapping for a set of product data is obtained from authoritative mappings table. At 405 it is determined whether a mapping exists for the aforementioned set of product data. If at 405 it is determined that a mapping exists for the set of product data, then at 407 it is determined if the mapping type is absolute. However, if at 405 it is found that a mapping does not exists for the set of product data, at 409 the set of product data is attempted to be matched with a master set of product data (SPD) in the master set of product data (SPD) table with the mapping rule that has the highest precedence.

At 411 it is determined whether at 409 a matching master set of product for the set of product data was found. If at 411 it is determined that a matching master set of product data for the set of product data was found at 409, then at 413 the corresponding mapping is inserted into the authoritative mapping table with mapping type=mapping type of the current mapping rule. If at 411 it is determined that a matching master set of product data for the set of product data was not found, at 415 an attempt is made to match the set of product data with a master set of product data with the mapping rule that has the next highest level of precedence. At 417 it is determined whether at 415 a mapping for the set of product data was found. If at 417 it is determined that a matching master set of product data was found at 415 then the corresponding mapping is inserted into the authoritative mapping table with mapping type=mapping type of current mapping rule at 413. If at 417 it is determined that a matching master set of product data was not found at 415 then at 419 an attempt is made to find a matching master set of product data using the mapping rule that has the next highest level of precedence. This process is continued until the mapping rules are exhausted wherein a new master set of product data is created at 421 using the set of product data. Then, at 423 a corresponding mapping is inserted into the authoritative mapping table with mapping type=unknown.

Referring again to 407, if it is determined that the mapping determined at 405 is not authoritative the set of product data is attempted to be matched with a master set of product data from the master set of product data table at 425 with the mapping rule that has the highest precedence. If at 427 it is determined that a matching set of product data exists at 431 the associated new master set of product data ID is inserted into the authoritative mapping table with the mapping type of the mapping rule. If at 427 it is determined that a matching set of product data does was not found at 425, at 433 an attempt is made to match the set of product data with a master set of product data with the mapping rule that has the next highest level of precedence. At 435 it is determined whether at 433 a mapping for the set of product data was found. If at 435 it is determined that a matching master set of product data was found at 433 then at 431 the authoritative mapping table is updated to include the new master set of product data ID that is associated with the matching master set of product data. If at 435 it is determined that a matching master set of product data was not found at 433 then at 437 an attempt is made to find a matching master set of product data using the mapping rule that has the next highest level of precedence. This process is continued until the mapping rules are exhausted.

Referring again to FIG. 4, data obtained after one of operations 407, 413, 423 or 431 is used to attempt to obtain a master data ID from authoritative mappings table at 439 and from current mappings table at 441. At 443 if it is determined that a master ID for the master set of product data is found in the current mappings table at 441, then at 445 it is determined whether the master ID for the master set of product data found in the current mappings table at 441 is the same as the master ID for the master set of product data found in the authoritative mapping table at 439. If it is determined that the master ID found in the current mappings table is the same as that found in the authoritative mapping table, then the setting for current mappings is set to processed=true, at 447 where master ID is updated to be the same as the master ID for the master set of product data found in the authoritative mapping table.

However, if at 445 it is determined that the master ID found in the current mappings table is not the same as that which is found in the authoritative mapping table, then it is determined at 449 if there is a master ID (that is similar to the one found in authoritative mappings table) in the current mappings table. If it is determined that such a master ID is found in current mappings table, then at 451 the current mappings table is updated (processed is set to equal true) and the master ID is associated with the master set of product data. If it is determined that there is not such a master ID found in current mappings table at 453 the mapping is inserted into current mappings table where processed is set to equal one. At 455 the master ID from either 453 or 455 and the master ID from the current mappings table are inserted into the master redirection table (as a pair), and at 457 an obsolescence process is run on the master ID from the current mapping table.

Returning again to step 443, if a master ID is not found in current mapping table, then at 459 it is determined whether a master ID exists in the mapping table, and if not at 461 a master set of product data with master ID the same as that found in the authoritative mappings table is created and thereafter at 463 is inserted into the current mapping table with processed set to 1. If it is determined at 459 that a master ID exist in mapping table, then at 463 the mappings are inserted into the current mapping table with processed set to 1.

At 465 attributes from the set of product data are contributed to the master set of product data based on precedence rules. And, at 467 associated offers are contributed to the master set of product data.

Exemplary embodiments, using an algorithm such as algorithm 300 discussed above, can be employed to provide an effective product catalog and create an optimal user experience for customers. Moreover, using the algorithm the number of duplicated products in the catalog can be minimized to not only reduce confusion (e.g., what is the "real" product), but also to provide the richest meta-data about each product. Additionally, since each external data provider provides different pieces of product meta-data as a part of a set of product data, the contributions form a very rich description of the product.

Exemplary Hardware and Operating Environment According to One Embodiment

Figure 5:
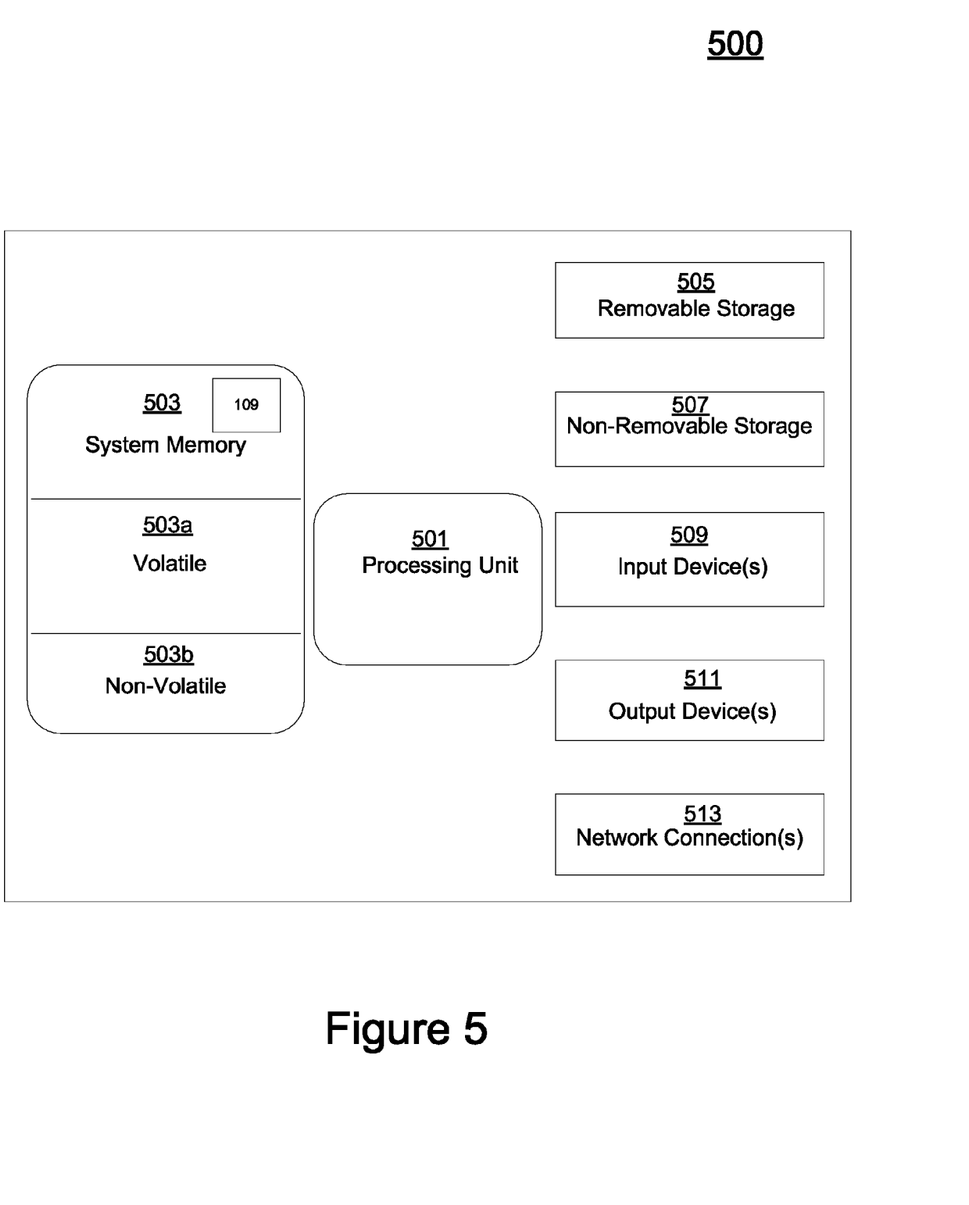
FIG. 5 shows an exemplary computing device according to one embodiment.

FIG. 5 shows an exemplary computing device 500 according to one embodiment. Referring to FIG. 5, computing device 500 can be included as a part of a server (e.g., website server 103 in FIG. 1A) and/or an interface device (interface device 111 in FIG. 1A) in accordance with one embodiment. Computing device 500 typically includes at least some form of computer readable media. Computer readable media can be any available media that can be accessed by computing device 500 and can include but is not limited to computer storage media.

In its most basic configuration, computing device 500 typically includes processing unit 501 and system memory 503 (which can include system 109 described with reference to FIGS. 1A and 2A). Depending on the exact configuration and type of computing device 500 that is used, system memory 503 can be volatile (such as RAM) 503*a*, non-volatile 503*b* (such as ROM, flash memory, etc.) or some combination of the two.

Additionally, computing device 500, especially the version that can be a part of website server 103 in FIG. 1A, can include mass storage systems (removable 505 and/or non-removable 507) such as magnetic or optical disks or tape. Similarly, computing device 500 can include input devices 509 and/or output devices 511 (e.g., such as a display). Additionally, computing device 500 can include network connections 513 to other devices, computers, networks, servers, etc. using either wired or wireless media. As all of these devices are well known in the art, they need not be discussed in detail.

With reference to exemplary embodiments thereof, methods (and systems) for aggregation of product data provided from external sources of product data for presentation on an e-commerce website are disclosed. As a part of a method, a set of product data related to a product that is offered for sale in e-commerce is accessed and subjected to an aggregation process. The set of product data is mapped for aggregation with other sets of product data based on an existing mapping or on an absence of an existing mapping. Access is provided to an aggregated set of product data that includes the set of product data that is mapped for aggregation with other sets of product data, for presentation on an e-commerce website.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for aggregation of product data provided from external sources for presentation on an e-commerce website, comprising:
    accessing, using a processor, a set of product data related to a product that is offered for sale in e-commerce;
    subjecting, using said processor, said set of product data to an aggregation process wherein said set of product data is mapped for aggregation with other sets of product data that are related to said product based on an existing mapping or on an absence of an existing mapping; and
    providing access, using said processor, to an aggregated set of product data, that comprises said set of product data that is mapped for aggregation with other sets of product data, for presentation on an e-commerce website.

2. The method of claim 1 further comprising:
    remapping a set of product data from one master set of product data to another master set of product data if attributes in said set of product data have changed and those attributes are contained in the mapping rule used to map said set of product data to said first master set of product data.

3. The method of claim 1 wherein said accessing comprises receiving a set of product data and its associated price and delivery information.

4. The method of claim 1 wherein said aggregation process comprises adding information contained in said set of data to existing data related to said product to produce said product data that comprises said set of product data that is mapped for aggregation.

5. The method of claim 1 wherein said subjecting determines a mapping rule for said set of data by accessing a mapping rule table one or more times to identify a mapping rule.

6. The method of claim 1 wherein said subjecting comprises accessing a mapping rules table sequentially to elicit rules in order of precedence until an appropriate rule is identified.

7. The method of claim 1 further comprising:
    determining if an identifier of said master set of product data is found in a first mappings table and if not updating said first mappings table to include said identifier of said master set of product data.

8. The method of claim 1 further comprising:
    determining if an identifier of said master set of product data is the same in a first mappings table as in a second mappings table and updating said first mappings table to include the same identifier of said master set of product data as resides in said second mappings table if said identifier of said master set of product data is not the same in a first mappings table.

9. A method for aggregation of product data provided from a plurality of sources for presentation on an e-commerce website, comprising:
    accessing, using a processor, a set of data related to a product that is offered for sale in e-commerce;
    determining, using said processor, if said set of data is mapped to an existing set of product data and if not mapping said set of data to an existing set of product data to comprise a set of aggregated product data or using said set of data alone to establish said set of aggregated product data;
    if said set of data is mapped to an existing set of product data and if the mapping has highest precedence, using, via said processor, said mapping to create said set of aggregated product data and if said mapping does not have highest precedence, using, via said processor, said mapping to create said set of aggregated product data or identifying an existing set of product data to which to map said set of data in order to create said set of aggregated product data; and
    providing access, using said processor, to said set of aggregated product data for presentation on an e-commerce website.

10. The method of claim 9 further comprising:
    remapping said set of product data from a first master set of product data to a second master set of product data if attributes in said set of product data have changed and those attributes are contained in the mapping rule used to map said set of product data to said first master set of product data.

11. The method of claim 9 wherein said accessing comprises receiving a set of product data and its associated price and delivery information.

12. The method of claim 9 wherein said aggregation of product data comprises adding information contained in said set of data to an existing master set of data related to said product to produce said aggregated product data.

13. The method of claim 9 further comprising:
    determining if an identifier of said aggregated product data is found in a first mappings table and if not updating said first mappings table to include said identifier of said aggregated product data.

14. The method of claim 9 further comprising:
    determining if an identifier of said aggregated product data is the same in a first mappings table as in a second mappings table and updating said first mappings table to include the same identifier of said aggregated product data as resides in said second mappings table if said identifier of said aggregated product data is not the same in a first mappings table.

15. A tangible computer-readable medium having computer-executable instructions for performing steps, comprising:
    receiving a set of product data related to a product that is offered for sale in e-commerce;
    subjecting said set of product data to an aggregation process wherein said set of product data is mapped for aggregation with other sets of product data that are related to said product based on mapping rules; and
    providing access to a master set of product data, that comprises said set of product data that is mapped for aggregation with other sets of product data related to said product, for integration into an e-commerce products catalog.

16. The tangible computer-readable medium of claim 15 further comprising:
    remapping a set of product data from one master set of product data to another master set of product data if attributes in said set of product data have changed and those attributes are contained in the mapping rule used to map said set of product data to said first master set of product data.

17. The tangible computer-readable medium of claim 15 further comprising:
    redirecting a URL associated with a first master set of product data to a second master set of product data if said first master set of product data has been deleted.

18. The tangible computer-readable medium of claim 15 wherein said aggregation process comprises adding information contained in said set of data to existing data related to said product to produce said aggregated product data.

19. The tangible computer-readable medium of claim 15 wherein said subjecting comprises accessing a mapping rule table one or more times to identify a mapping rule.

20. The tangible computer-readable medium of claim 15 wherein said subjecting comprises accessing a mapping rules table recursively to elicit rules in order of precedence until an appropriate rule is identified.

* * * * *